(12) United States Patent
Kashani et al.

(10) Patent No.: US 12,039,056 B2
(45) Date of Patent: Jul. 16, 2024

(54) SECURING SOFTWARE PACKAGE COMPOSITION INFORMATION

(71) Applicant: Denso Corporation, Kariya (JP)

(72) Inventors: Ameer Kashani, Southfield, MI (US); Carlos Mora-Golding, Southfield, MI (US); Gopalakrishnan Iyer, Santa Clara, CA (US)

(73) Assignee: Denso Corporation, Kariya (JP)

( * ) Notice: Subject to any disclaimer, the term of this patent is extended or adjusted under 35 U.S.C. 154(b) by 272 days.

(21) Appl. No.: 17/691,474

(22) Filed: Mar. 10, 2022

(65) Prior Publication Data

US 2023/0289448 A1 Sep. 14, 2023

(51) Int. Cl.
*G06F 21/57* (2013.01)
*H04L 9/06* (2006.01)

(52) U.S. Cl.
CPC .......... *G06F 21/577* (2013.01); *H04L 9/0643* (2013.01); *G06F 2221/033* (2013.01); *H04L 2209/84* (2013.01)

(58) Field of Classification Search
CPC .. G06F 21/577; G06F 2221/033; G06F 21/57; H04L 9/0643; H04L 2209/84
See application file for complete search history.

(56) References Cited

U.S. PATENT DOCUMENTS

| | | | |
|---|---|---|---|
| 9,418,227 B2* | 8/2016 | Franklin | H04L 63/145 |
| 9,565,202 B1* | 2/2017 | Kindlund | H04L 63/145 |
| 10,579,803 B1* | 3/2020 | Mueller | G06F 21/577 |
| 11,100,232 B1* | 8/2021 | Juncker | H04L 63/102 |
| 2014/0208425 A1* | 7/2014 | Palomaki | G06F 21/565 726/23 |
| 2014/0373160 A1* | 12/2014 | Shigemoto | G06F 21/577 726/25 |
| 2017/0109536 A1* | 4/2017 | Stopel | G06F 21/577 |
| 2017/0318030 A1* | 11/2017 | Liu | G06F 21/51 |
| 2017/0353476 A1* | 12/2017 | Gordon | G06F 21/568 |
| 2018/0096149 A1* | 4/2018 | Morkovský | G06F 11/302 |
| 2020/0117807 A1* | 4/2020 | Nadgowda | G06F 8/65 |
| 2020/0159512 A1* | 5/2020 | Schutt | G06F 21/64 |
| 2020/0202331 A1* | 6/2020 | Vudathu | G06Q 20/3672 |

(Continued)

*Primary Examiner* — Meng Li
(74) *Attorney, Agent, or Firm* — Christopher G. Darrow; Darrow Mustafa PC (57) ABSTRACT

Systems, methods, and other embodiments described herein relate to securing software composition information in a software management environment. In one embodiment, a method includes acquiring, in a managing device, identifying information about a software package installed on a remote device, including a unique identifier of an entity associated with the software package, and a secure identifier that combines the unique identifier with a package identifier of the software package. The method includes, responsive to identifying a vulnerability, generating a vulnerability identifier using the unique identifier of the entity and a vulnerability label that identifies a vulnerable package that includes the vulnerability. The method includes comparing the vulnerability identifier with the secure identifier to determine whether the software package includes the vulnerability. The method includes providing a response about the vulnerability when the vulnerability identifier matches the secure identifier.

18 Claims, 5 Drawing Sheets

(56) References Cited

U.S. PATENT DOCUMENTS

| | | | |
|---|---|---|---|
| 2020/0242251 A1* | 7/2020 | Wisgo | G06F 21/564 |
| 2020/0389491 A1* | 12/2020 | Buck | G06F 21/88 |
| 2021/0133328 A1* | 5/2021 | Wu | G06F 8/65 |
| 2021/0200872 A1* | 7/2021 | Cannings | G06F 21/566 |
| 2021/0203668 A1* | 7/2021 | Butler | H04L 63/1416 |
| 2021/0382997 A1* | 12/2021 | Yi | G06F 21/577 |
| 2022/0138041 A1* | 5/2022 | Degrass | G06F 11/0709 |
| | | | 714/38.1 |
| 2023/0041769 A1* | 2/2023 | Wolfe | H04L 63/0428 |
| 2024/0031380 A1* | 1/2024 | Lal | H04L 63/0263 |

* cited by examiner

FIG. 5

SECURING SOFTWARE PACKAGE COMPOSITION INFORMATION

TECHNICAL FIELD

The subject matter described herein relates in general to systems and methods for securing software package composition information and, more particularly, to secure registration and monitoring of software package composition.

BACKGROUND

Traditionally, vehicle security has involved a vehicle owner using a physical key to lock a door and/or start a vehicle manually. As technology advances, vehicle systems have transitioned into more complex systems that involve additional features but also encounter additional/different risks. For example, many vehicles now include electronic systems that implement complex software systems, such as operating systems, applications, and other software that can include different combinations of software packages to provide various functionality.

Management of the software packages can be a complex task when considering that the vehicle may include multiple different systems with different operating systems, applications, and so on that may function with different hardware (e.g., sensors), and so on. Thus, as one example, managing updates to the software packages, identifying vulnerabilities, and so on generally relies on the accurate tracking of the different packages that are installed since awareness of the noted issues relies on accurate knowledge of the installed components. However, managing software packages can reveal sensitive details about the software implemented on the vehicle. For example, adversaries can use knowledge of the software packages to facilitate reverse engineering systems of the vehicle. As such, available approaches may not provide adequate security and can lead to separate vulnerabilities.

SUMMARY

In one embodiment, example systems and methods associated with securing software composition information in a software management environment are disclosed. As previously noted, vehicles may include complex electronic systems that implement similarly complex software to provide various functionality. Accordingly, with the increased complexity arises issues with managing such software. In particular, the software can include vulnerabilities that an entity may discover after installation. As such, management of the software packages and monitoring for the noted vulnerabilities becomes an important aspect to ensuring the continued functioning of the associated systems. However, because providing an unsecured listing of installed software can lead to negative effects, such as sensitive details to adversaries about a structure of the vehicle systems, managing the software presents unique difficulties in the context of a combined service.

Therefore, in one approach, a disclosed system functions to obscure information about the software packages while implementing a mechanism for managing the software in relation to vulnerabilities. For example, in at least one approach, a software management system communicates with remote devices, such as vehicles, to acquire information about software packages stored thereon. To maintain secrecy in relation to the particular software packages, the remote device obscures the package identifiers by appending a unique identifier (e.g., a random number, cryptographic key, etc.) to the package identifiers and then generates a hash of the combined identifiers to provide secure identifiers as output. Accordingly, the remote device can then register the software package with, for example, a cloud-based managing device/service that can manage similar information for multiple different entities (e.g., different vehicle manufacturers) without exposing the underlying information about the software. In general, the remote device provides the secure identifier along with the unique identifier to the managing service to register. Thereafter, the managing service monitors for vulnerabilities.

In one arrangement, when the managing service identifies a vulnerability, the service can scan stored secure identifiers to determine whether the remote device includes a software package with the vulnerability. Because the managing service does not have knowledge about the original software package associated with the secure identifiers in order to provide for security, the managing service mimics the process performed by the remote device in forming the secure identifiers. That is, for example, the managing service combines the package identifier for the vulnerability software package with the unique identifier of the remote device and then hashes the combination into a vulnerability identifier. The resulting vulnerability identifier, if for a same software package as included on the remote device, should then mirror an associated secure identifier without revealing the underlying information to an adversary.

The managing service then uses the vulnerability identifier as a mechanism to compare with stored secure identifiers for the remote device. If the vulnerability identifier matches one of the secure identifiers for the remote device, then the matching secure identifier indicates the presence of the vulnerability in an associated software package. In this way, the present approach improves the security of software composition information while facilitating a managing service that is accessible by different entities.

In one embodiment, a managing system is disclosed. The managing system includes one or more processors and a memory that is communicably coupled to the one or more processors. The memory stores a control module including instructions that, when executed by the one or more processors, cause the one or more processors to acquire, in a managing device, identifying information about a software package installed on a remote device, including a unique identifier of an entity associated with the software package, and a secure identifier that combines the unique identifier with a package identifier of the software package. The control module including instructions to responsive to identifying a vulnerability, generate a vulnerability identifier using the unique identifier of the entity and a vulnerability label that identifies a vulnerable package that includes the vulnerability. The control module including instructions to compare the vulnerability identifier with the secure identifier to determine whether the software package includes the vulnerability. The control module including instructions to provide a response about the vulnerability when the vulnerability identifier matches the secure identifier.

In one embodiment, a non-transitory computer-readable medium is disclosed. The computer-readable medium stores instructions that, when executed by one or more processors, cause the one or more processors to perform the disclosed functions. The instructions include instructions to acquire, in a managing device, identifying information about a software package installed on a remote device, including a unique identifier of an entity associated with the software package, and a secure identifier that combines the unique identifier with a package identifier of the software package. The instructions include instructions to, responsive to identifying a vulnerability, generate a vulnerability identifier using the unique identifier of the entity and a vulnerability label that identifies a vulnerable package that includes the vulnerability. The instructions include instructions to compare the vulnerability identifier with the secure identifier to determine whether the software package includes the vulnerability. The instructions include instructions to provide a response about the vulnerability when the vulnerability identifier matches the secure identifier.

In one embodiment, a method is disclosed. In one embodiment, the method includes acquiring, in a managing device, identifying information about a software package installed on a remote device, including a unique identifier of an entity associated with the software package, and a secure identifier that combines the unique identifier with a package identifier of the software package. The method includes, responsive to identifying a vulnerability, generating a vulnerability identifier using the unique identifier of the entity and a vulnerability label that identifies a vulnerable package that includes the vulnerability. The method includes comparing the vulnerability identifier with the secure identifier to determine whether the software package includes the vulnerability. The method includes providing a response about the vulnerability when the vulnerability identifier matches the secure identifier.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with securing software composition information in a software management environment are disclosed. As previously noted, vehicles may include complex electronic systems for automated/autonomous functions that implement similarly complex software. Accordingly, with the increased complexity arises issues with managing such software. In particular, the software can include many different components that are subject to different vulnerabilities and that an entity likely will not discover until after installation. As such, management of the software packages and monitoring for the noted vulnerabilities becomes an important aspect to ensuring the continued functioning of the associated systems. However, because providing an unsecured listing of installed software can lead to negative effects, such as revealing sensitive details to adversaries about the structure of a vehicle system, managing the software presents unique difficulties in the context of a combined service.

Therefore, in one approach, a disclosed system functions to obscure information about the software packages while implementing a mechanism for managing the software in relation to vulnerabilities. For example, in at least one approach, a software management system communicates with remote devices, such as vehicles, to acquire information about software packages stored thereon. To maintain secrecy in relation to the particular software packages, the remote device obscures the package identifiers by appending a unique identifier (e.g., a random number, cryptographic key, etc.) to the package identifiers and then generates a hash of the combined identifiers to provide secure identifiers as output. Accordingly, the remote device can then register the software package with, for example, a cloud-based managing device/service that can manage similar information for multiple different entities (e.g., different vehicle manufacturers) without exposing the underlying information about the software. In general, the remote device provides the secure identifier along with the unique identifier to the managing service to register. Thereafter, the managing service monitors for vulnerabilities.

In one arrangement, when the managing service identifies a vulnerability, the service can scan stored secure identifiers to determine whether the remote device includes a software package with the vulnerability. Because the managing service does not have knowledge about the original software package associated with the secure identifiers in order to provide for security, the managing service mimics the process performed by the remote device in forming the secure identifiers. That is, for example, the managing service combines the package identifier for the vulnerability software package with the unique identifier of the remote device and then hashes the combination into a vulnerability identifier. The resulting vulnerability identifier, if for a same software package as included on the remote device, should then mirror an associated secure identifier without revealing the underlying information to an adversary.

The managing service then uses the vulnerability identifier as a mechanism to compare with stored secure identifiers for the remote device. If the vulnerability identifier matches one of the secure identifiers for the remote device, then the matching secure identifier indicates the presence of the vulnerability in an associated software package. In this way, the present approach improves the security of software composition information while facilitating a managing service that is accessible by different entities.

Figure 1:
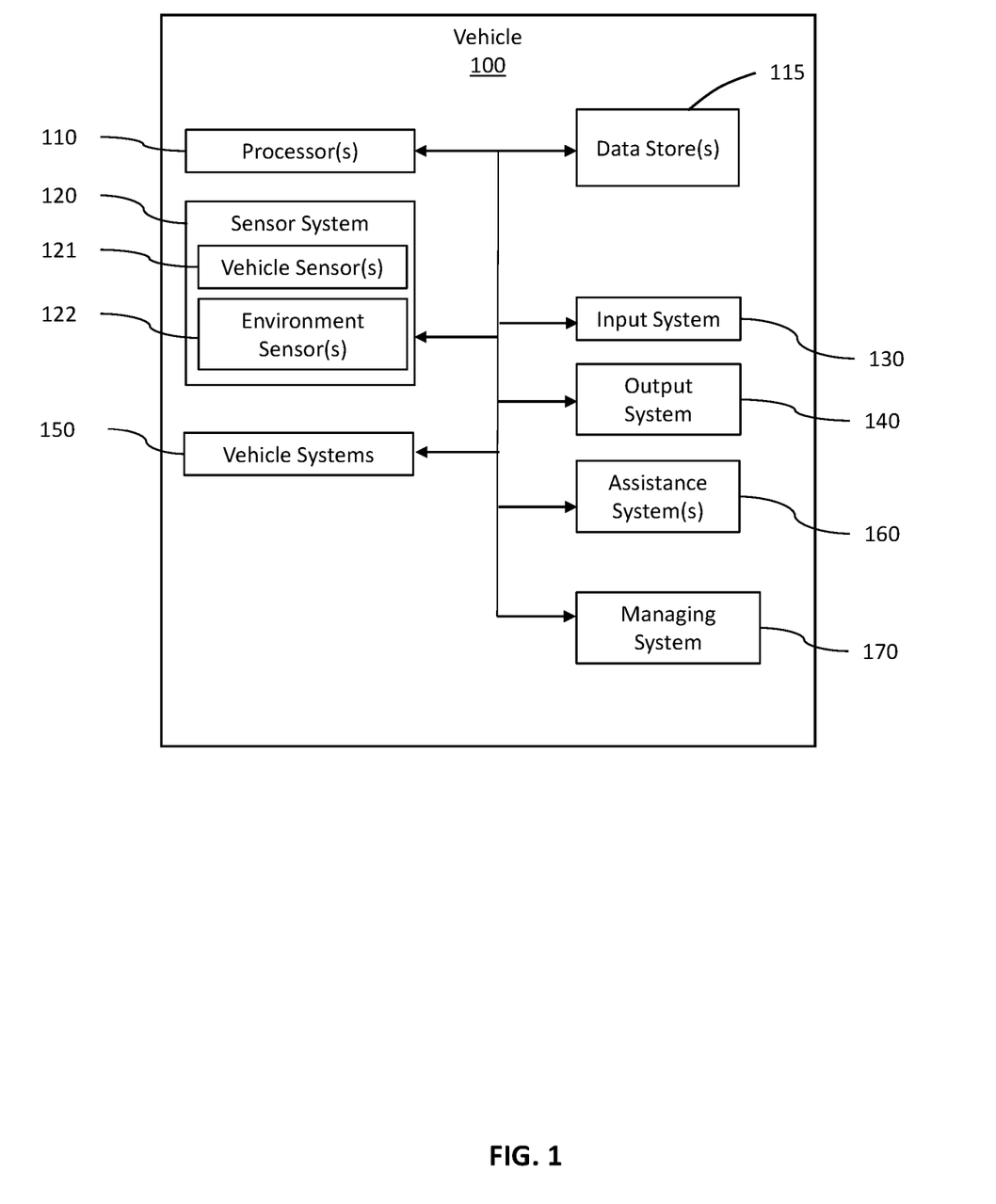
FIG. 1 illustrates one embodiment of a configuration of a vehicle in which example systems and methods may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may instead be an electronic device, a cloud-based system communicating with remote devices, or other devices that may implement electronic systems that include vulnerable software components, and thus benefit from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services). In at least one arrangement, the managing system 170 is implemented as a local client on the vehicle 100 while also including an instance within a remote cloud-based resource that functions to register software packages from a multitude of different sources.

Some of the possible elements of the vehicle 100 are shown in FIG. 1 and will be described along with subsequent figures. A description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a managing system 170 that functions to track and register software packages that are installed therein. Moreover, while depicted as a standalone component, in one or more embodiments, the managing system 170 is integrated with the assistance system 160, or another similar system of the vehicle 100. Additionally, as noted previously, the managing system 170 is further implemented as a cloud-based resource to provide for, in one arrangement, a central repository for software information that can function to independently monitor for new vulnerabilities as discussed further subsequently. The noted functions and methods will become more apparent with a further discussion of the figures.

Figure 2:
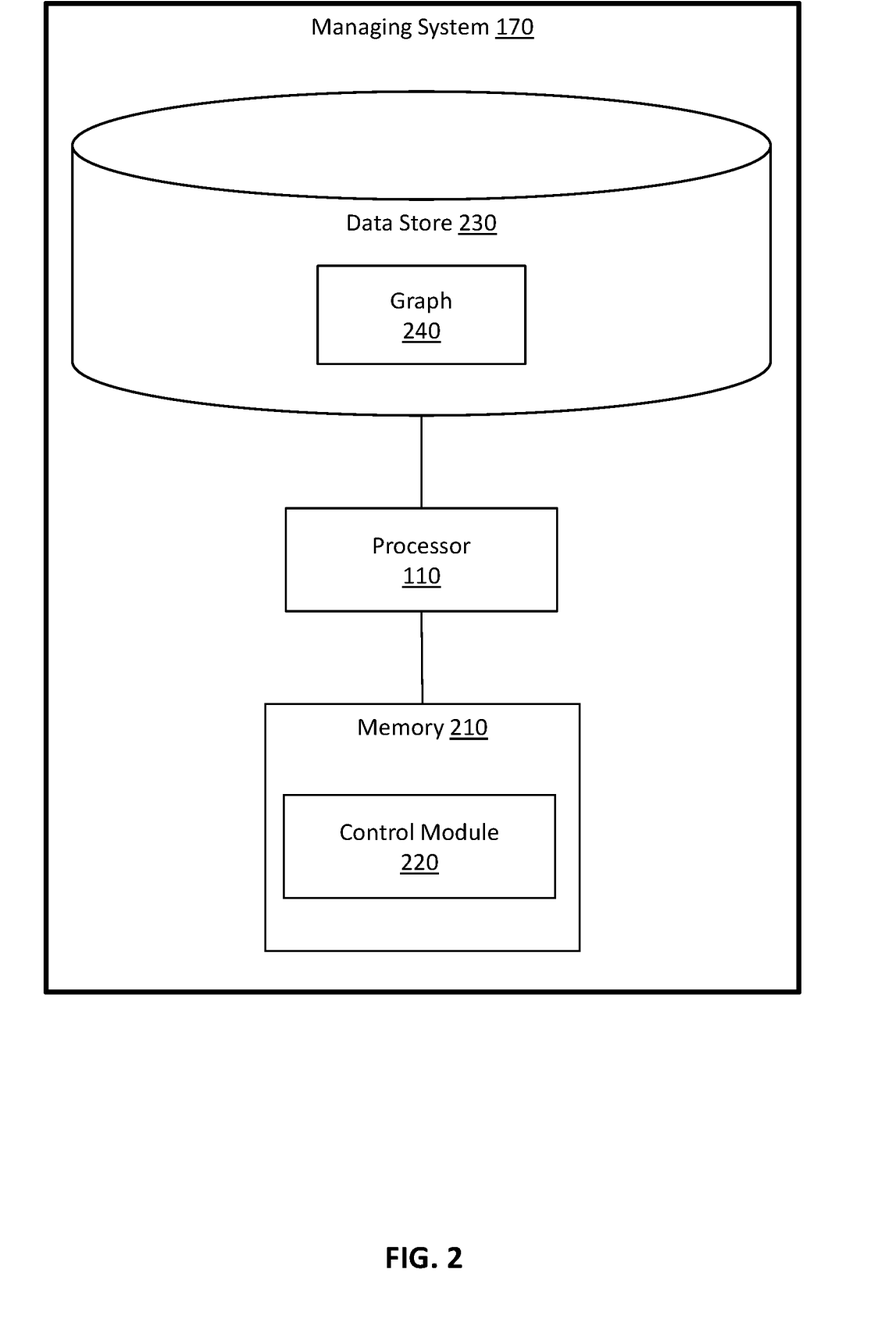
FIG. 2 illustrates one embodiment of a managing system that is associated with secure software package composition information.

With reference to FIG. 2, one embodiment of the managing system 170 is further illustrated. As shown, the managing system 170 includes a processor 110. Accordingly, the processor 110 may be a part of the managing system 170, or the managing system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor that is capable of performing various functions as described herein when executing encoded functions associated with the managing system 170. Moreover, the processor 110 or another electronic processing unit associated with the managing system 170 executes various programs that are to be registered and tracked for vulnerabilities. It should be appreciated that as used herein, the terms program, application, software package, and software all refer to the same element of a piece of software.

In various embodiments, the particular functionality of a software package may vary but can include automated driving functions (e.g., ADAS functions, machine perception, mapping, object detection/identification, path planning, vehicle control routines, and so on), functions associated with control of the vehicle 100, execution of infotainment systems within the vehicle 100, operating systems and associated components, and so on. Thus, various aspects of the program may be related to the functional safety of the vehicle 100, sensitive/personal information, system operation, and so on. Moreover, while the programs are generally described from a functional viewpoint, it should be appreciated that the programs may take different forms. That is, the programs may be firmware, operating systems, applications, and so on.

Returning to FIG. 2, in one embodiment, the managing system 170 includes a memory 210 that stores a control module 220 and, in various configurations, additional elements (e.g., software packages). The memory 210 is a random-access memory (RAM), read-only memory (ROM), a hard disk drive, a flash memory, or other suitable memory for storing the module 220. In any case, the control module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions. Thus, the control module 220 may be embodied as instructions within the memory 210 or as a standalone component, such as a system-on-a-chip (SoC), ASIC, or another electronic device.

Furthermore, in one embodiment, the managing system 170 includes a data store 230. The data store 230 is, in one arrangement, an electronically-based data structure for storing information. For example, in one approach, the data store 230 is a database that is stored in the memory 210 or another suitable electronic storage medium (e.g., RAM, ROM, on-chip cache, etc.), and that is configured with routines that can be executed by the processor 110 for analyzing stored data, providing stored data, organizing stored data, and so on. In any case, in one arrangement, the data store 230 stores data used by the control module 220 in executing various functions. In one embodiment, the data store 230 includes a graph 240 along with, for example, other information (e.g., observed characteristics of executing programs) that is used by the control module 220. The data store 230 may further include a unique identifier for the vehicle 100, secure identifiers of software packages included on the vehicle 100, and so on.

The graph 240, in one or more arrangements, identifies relationships between separate programs/packages of software. In various instances, some of the separate programs may actually be installed together to define a larger application. In any case, the graph 240 embodies a sequencing of execution for the programs and relationships therebetween, which may be useful in determining the effects of a vulnerability and/or how to resolve a vulnerability. In this way, the graph 240 provides information for tracking the various software packages within a system. Moreover, the identifiers mentioned previously, in particular, the package identifier can take different forms. In various embodiments, the package identifier is a standard name for the software package, which may be regulated by a central authority. In further approaches, the package identifier includes information in addition to the name, such as a version number, and so on.

Turning to the functioning of the control module 220, in general, the control module 220 includes instructions that function to control the processor 110 to track software vulnerabilities of software packages installed within the vehicle 100. In the instance of the managing system 170 being installed locally at the vehicle 100, the managing system 170 generally functions to track the software packages of the vehicle 100 by, for example, registering the software packages with an instance of the managing system 170 that is, for example, a cloud-based resource.

To register a software package, the control module 220 generates a secure identifier of the software package. In one approach, the control module 220 combines the package identifier (e.g., the name of the software package and a version number) with a unique identifier associated with the vehicle 100. The unique identifier can take different forms depending on the particular implementation but generally includes a secure piece of data that is unique to the vehicle 100, such as a cryptographic key, a random number, or some other value that is secret and specific to the vehicle 100. The control module 220 proceeds by hashing the combination of the unique identifier and the package identifier to generate the secure identifier.

In one arrangement, the control module 220 uses a one-way cryptographic hash function, such as MD5, SHA-1, SHA-2, or another suitable hash function. Thus, in various configurations, an alternative to appending the unique identifier to the package identifier, the control module 220 may use the unique identifier as a salt or seed value of the hash function to ensure the secure identifier is robust against malicious attack to reverse the hash and provide the underlying information. In any case, once the control module 220 generates the secure identifier, the control module 220 registers the software package by communicating the secure identifier along with the unique identifier to a managing service.

The managing service is, for example, a cloud-based resource that implements an instance of the managing system 170. Accordingly, the control module 220, in the context of the cloud-based managing service, functions to acquire, via the noted communication, the identifying information about the software package and the entity with which the software package resides (i.e., the secure identifier and the unique identifier). The control module 220 can then log the information about the software package for the vehicle 100 so that the managing service can monitor for vulnerabilities. It should be noted that while the individual vehicle 100 is discussed, in further approaches, the providing entity may be a vehicle manufacturer, parts supplier, or another entity that registers the software package on a per-product basis. That is, instead of monitoring individual vehicles, the managing service may monitor particular products (i.e., a make/model of vehicle, a particular part/component that implements a suite of software, etc.).

Figure 3:
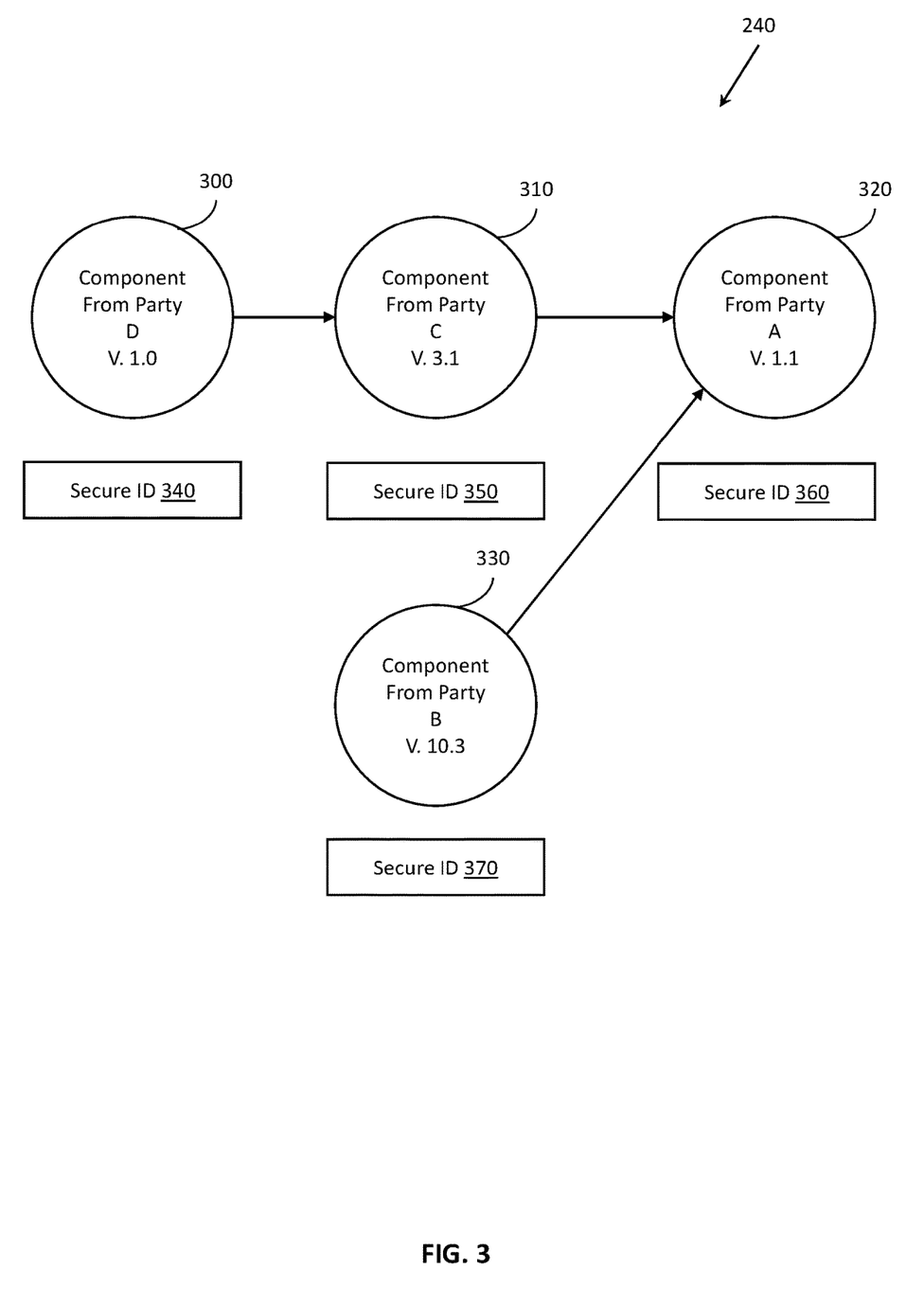
FIG. 3 illustrates one example of a graph that identifies relationships between different software packages.

As a further example of the software packages and the secure ID, consider FIG. 3, which illustrates one example of the graph 240. As shown in FIG. 3, the graph 240 includes multiple separate software packages with processing relationships indicated by the included arrows. Software packages 300 and 310 establish a dependency branch with software package 320, while software package 330 also includes a processing dependency with the software package 320. Moreover, as shown, the package identifiers may be "Component From Party D" and "V1.0 "for the software package 300. Accordingly, the control module 220 may use the noted elements in a concatenated form as the package identifier for package 300. Similarly, the control module 220 forms the package identifiers for the additional packages 310, 320, and 330. Moreover, the control module 220 generates a secure identifier (340, 350, 360, and 370) for each of the package identifiers. As noted, the control module 220 applies a hash using a unique identifier of the entity (i.e., the vehicle 100 and/or the entity) to generate the secure identifiers. The secure identifiers themselves may be in the form of a hexadecimal string (e.g., 128 bits). Lastly, the control module 220 may maintain the graph structure and the relationships as the graph 240 in order to identify upstream components where a vulnerability may affect the operation of another component and may further explicitly indicate the relationships when identifying a vulnerability in order to ensure appropriate patching and/or other checks of data.

Returning to FIG. 2, the control module 220, in the context of the managing service, further functions to identify vulnerabilities and which packages may be subject to the vulnerability. In order to identify specific vulnerabilities, the managing system 170 aggregates information from multiple different sources, such as industry groups, software developers, security monitoring services, and so on. When the control module 220 identifies a confirmed vulnerability through these sources, the control module 220 generates a vulnerability identifier as a mechanism for comparison against the stored secure identifiers from the vehicle 100 and/or other entities that are being monitored.

For example, in one approach, the control module 220 uses a vulnerability identifier that mirrors the secure identifier. Accordingly, the vulnerability identifier is generally formed from a vulnerability label and a unique identifier. That is, because the vulnerability is associated with a software package, the control module 220 uses an identifier of the software package with the vulnerability and any additional information (e.g., version number) that is being used to mimic the package identifier. Thus, the control module 220 forms a vulnerability label that parallels the package identifier in combination with the unique identifier of the entity (e.g., the vehicle 100) to form the vulnerability identifier by hashing the combined elements. Of course, this effort involves the control module 220 separately generating the vulnerability identifier for each separate entity since the separate entities have different unique identifiers.

In any case, once the control module 220 generates the vulnerability identifier, the control module 220 commences with comparing the vulnerability identifier to the secure identifiers of the same entity (e.g., the vehicle 100). The comparison is, in general, a one-to-one comparison of the vulnerability identifier with the secure identifier(s) to determine whether there is correspondence or not. Thus, it should be noted that in addition to using the same information as an input to the hash in the same way (i.e., whether the unique identifier is appended to the identifier or used as a salt/seed of the hash), the hash algorithm for generating the identifiers is also the same.

In any case, when the control module 220 identifies a secure identifier that matches the vulnerability identifier, the control module 220 has determined that the associated software package of the entity includes the vulnerability. Therefore, the control module 220 provides a response about the vulnerability when the vulnerability identifier matches the secure identifier. The response can include simply reporting the detection of the vulnerability to the entity through a communication/alert or may entail more complex measures. For example, the control module 220 may provide a patch along with the communication so that the entity can resolve the vulnerability. In further examples, the control module 220 may communicate instructions for disabling functionality in order to prevent malicious attacks until the vulnerability is resolved. In any case, the managing system 170 improves the functioning of the vehicle systems by providing a mechanism for securely and efficiently monitoring software for vulnerabilities.

Figure 4:
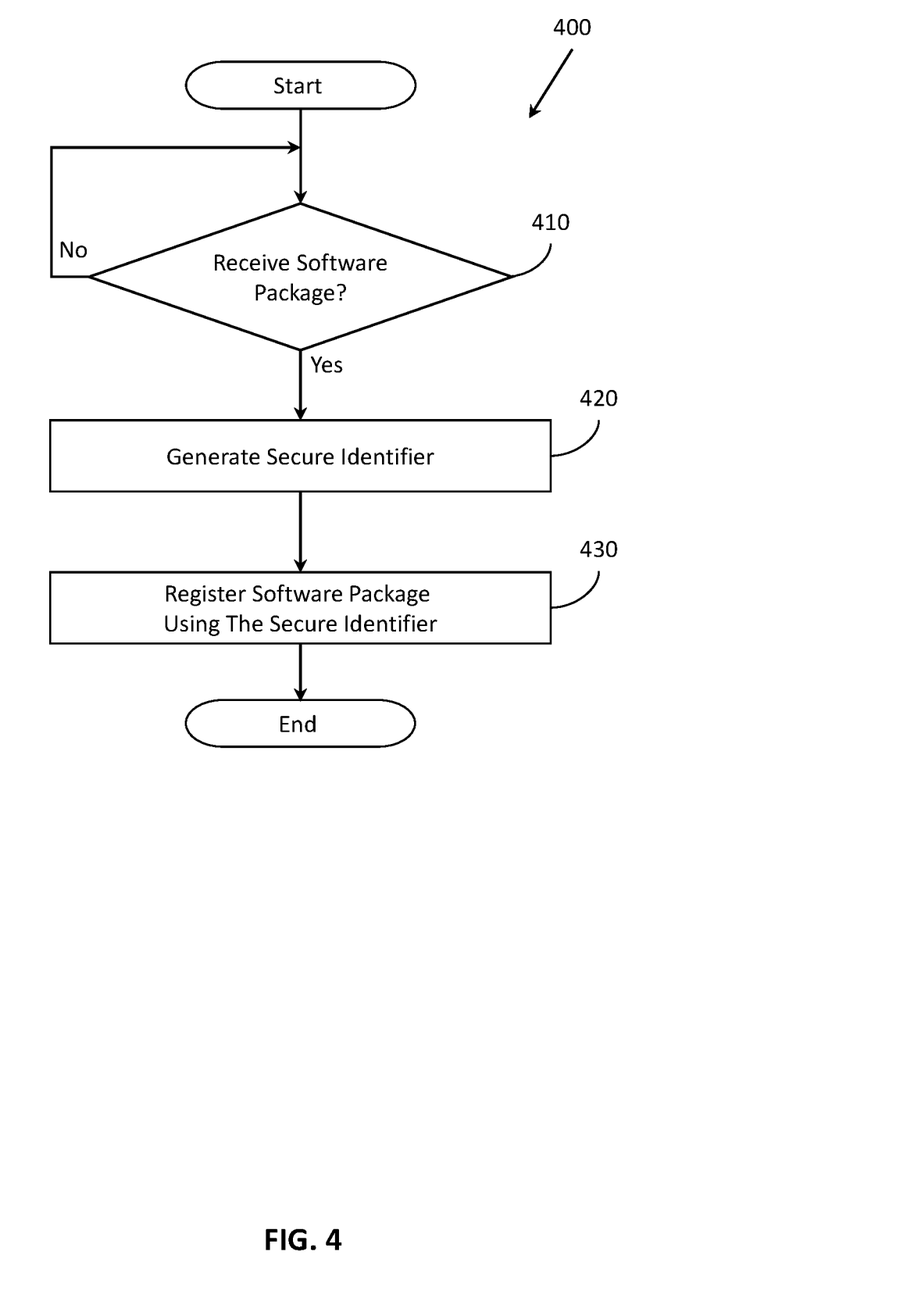
FIG. 4 illustrates one embodiment of a method associated with a remote device registering a software package with a managing system.

Additional aspects of registering software packages and monitoring for vulnerabilities will be discussed in relation to FIGS. 4 and 5. FIG. 4 illustrates a method 400 associated with registering a software package for monitoring by a centralized service. Method 400 will be discussed from the perspective of the managing system 170 of FIGS. 1 and 2. While method 400 is discussed in combination with the managing system 170, it should be appreciated that the method 400 is not limited to being implemented within the managing system 170 but is instead one example of a system that may implement the method 400.

At 410, the control module 220 receives information about a software package that is to be registered for vulnerability monitoring. In one or more arrangements, the control module 220 receives the information responsive to deployment of the software package among vehicles of an OEM. As described previously, the entity that is implementing the software package may provide the information, or the individual instances (e.g., within the vehicle 100) may provide the information directly for each separate implementation occurrence. In any case, the information generally includes at least a package identifier that can include an entity name, a standardized name of the software itself, and a version number. Moreover, the entity also has or separately derives a unique identifier that specifically identifies the entity. The unique identifier may be a random number, a cryptographic key, or another unique value that is specific to the entity.

At 420, the control module 220 within an instance of the entity (i.e., the vehicle 100 or an asset management system of the entity) generates the secure identifier. In one arrangement, the control module 220 generates the secure identifier by combining the package identifier with the unique identifier to form a combined identifier. In general, combining the values includes appending the unique identifier to the package identifier. However, as noted previously, in one or more arrangements, the unique identifier may instead be used as a seed/salt value for the hash algorithm. Once the combined identifier is formed, the control module 220 hashes the combined identifier to generate the secure identifier and disguise the combined identifier from identification.

At 430, the control module 220 registers the software package with a managing device. In one or more arrangements, the control module 220 communicates the secure identifier and the unique identifier to the managing device in order to register. The managing device is, in various approaches, a cloud-based resource that monitors software packages for multiple different entities, including different businesses that may have conflicting/adversarial interests. Thus, by obscuring the software package information as described, the managing system 170 is able to maintain the anonymity of the entity and the software packages associated with the entity while still benefiting from combined asset monitoring.

Figure 5:
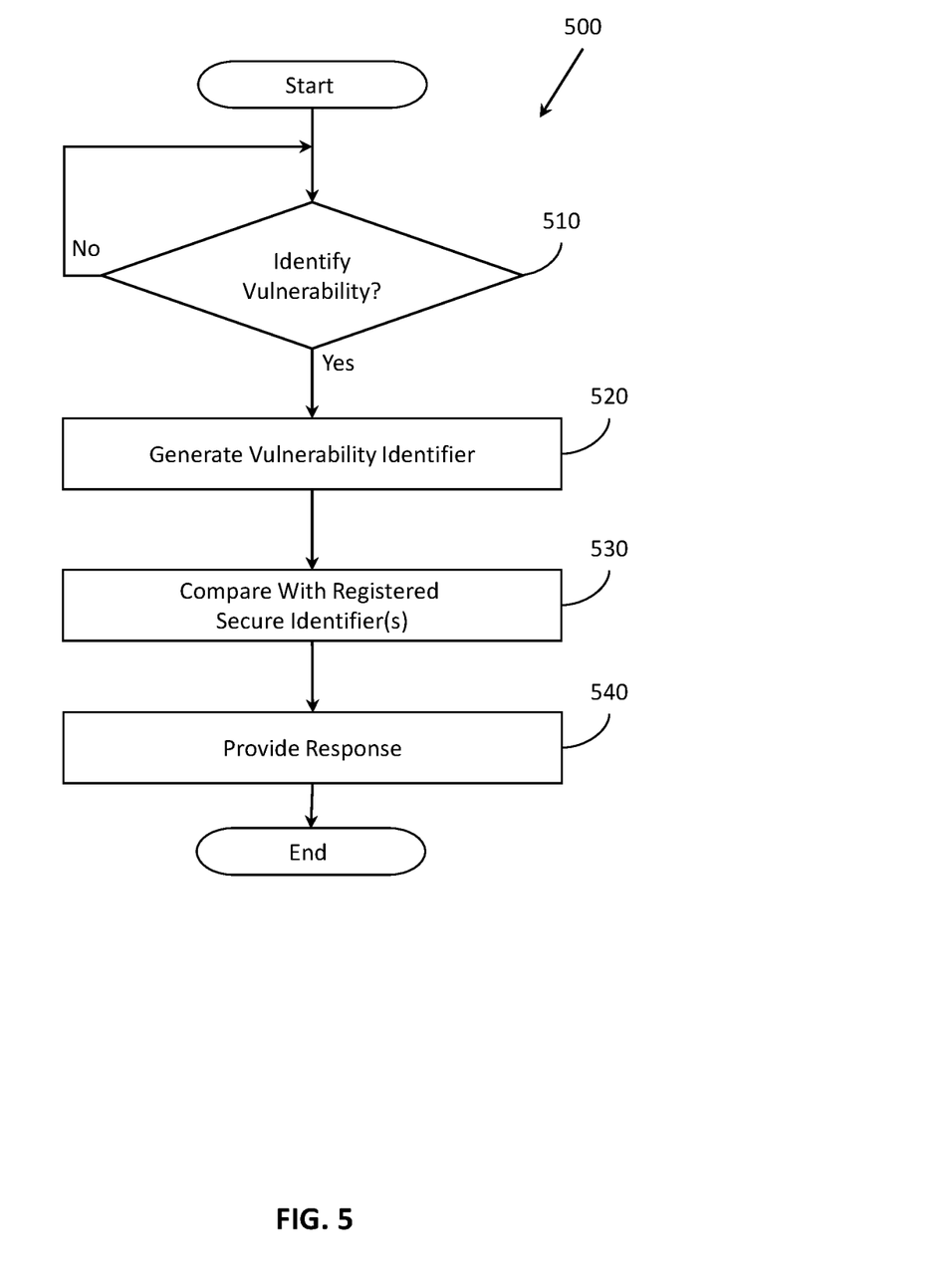
FIG. 5 illustrates one embodiment of a method associated with identifying vulnerabilities among software composition information.

FIG. 5 illustrates a method 500 associated with monitoring for vulnerabilities in software packages that are obfuscated. Method 500 will be discussed from the perspective of the managing system 170 of FIGS. 1 and 2. While method 500 is discussed in combination with the managing system 170, it should be appreciated that the method 500 is not limited to being implemented within the managing system 170 but is instead one example of a system that may implement the method 500.

At 510, the control module 220 monitors for a vulnerability in various software packages. The control module 220, in the instance of the managing device, does not have knowledge of the particular software package that has been registered, but simply knows that an entity has registered a software package for monitoring. Thus, the control module 220 does not discriminate about which software packages are monitored and instead considers vulnerabilities from a wide range of different software packages. Thus, the control module 220 identifies vulnerabilities by harvesting information from various sources, including software bulletins, advisories from software companies, vulnerability databases, and so on. As such, when the control module 220 detects a vulnerability, the control module 220 proceeds to determine whether any of the registered software packages match a software package associated with the vulnerability. As a general matter, a vulnerability, as used herein, refers to a security flaw, a glitch, or a weakness in a software package that could be exploited by a malicious attacker to cause unintended results in the operation of the software package.

At 520, the control module 220 generates a vulnerability identifier. In one configuration, the vulnerability identifier mimics a form of the secure identifier. That is, the control module 220 generates the vulnerability identifier using the same information as used in the secure identifier so that if the vulnerability is in the same software package, then the vulnerability identifier and the secure identifier should match. As such, the control module 220 generates a vulnerability identifier using the unique identifier of the entity and a vulnerability label that identifies a vulnerable package that includes the vulnerability. The control module 220 hashes the information and provides the vulnerability identifier for comparison.

At 530, the control module 220 compares the vulnerability identifier with the secure identifier to determine whether the software package includes the vulnerability. The control module 220 compares, in one arrangement, all registered secure identifiers for an entity with the vulnerability identifier to determine if any of the registered software packages include the vulnerability. Moreover, as discussed in relation to FIG. 3, the control module 220 may further compare the vulnerability identifier with different secure identifiers according to relationships defined in the graph 240. That is, where relationships between different software packages are known according to the graph 240, the control module 220 can further compare the vulnerability identifier with those relationships/dependencies from the graph 240 in order to provide a comprehensive review of software packages that may be impacted by the vulnerability. Moreover, where a vulnerability does exist, the control module 220 can define impacted software packages by review/search of the graph 240, which may facilitate subsequent patching of the software.

At 540, the control module 220 provides a response about the vulnerability when the vulnerability identifier matches the secure identifier. The control module 220 may undertake different responses depending on the particular implementation and capabilities of the managed devices. In any case, the control module 220, in one approach, at least communicates an alert to the entity about the vulnerability. In further approaches, the control module 220 generates an alert including a patch or at least an identifier of the patch to resolve the vulnerability. In this way, the managing system 170 defines a mechanism to hide/disguise the entity and the software packages implemented by the entity, thereby improving security while also providing an efficient monitoring system.

Additionally, it should be appreciated that the managing system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the managing system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps.

The one or more data stores 115 can include sensor data. In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the managing system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the managing system 170, and/or the assistance system 160 may control some or all of these vehicle systems 150 and, thus, may be partially or fully autonomous.

The processor(s) 110, the managing system 170, and/or the assistance system 160 can be operatively connected to communicate with the various vehicle systems 150 and/or individual components thereof. For example, returning to FIG. 1, the processor(s) 110, the managing system 170, and/or the assistance system 160 can be in communication to send and/or receive information from the various vehicle systems 150 to control the movement, speed, maneuvering, heading, direction, etc. of the vehicle 100. The processor(s) 110, the managing system 170, and/or the assistance system 160 may control some or all of these vehicle systems 150.

The processor(s) 110, the managing system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the managing system 170, and/or the assistance system 160 can control the direction and/or speed of the vehicle 100. The processor(s) 110, the managing system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the managing system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160, either independently or in combination with the managing system 170, can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such as determinations from the system state. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A managing system, comprising:
one or more processors; and
a memory communicably coupled to the one or more processors and storing:
a control module including instructions that, when executed by the one or more processors, cause the one or more processors to:
acquire, in a managing device, identifying information about a software package installed on a remote device, including a unique identifier of an entity that is an end user of the software package, and a secure identifier that combines the unique identifier with a package identifier of the software package;
responsive to identifying a software vulnerability, generate a vulnerability identifier using the unique identifier of the entity that is the end user of the software package and a vulnerability label that identifies a vulnerable software package that includes the software vulnerability;
compare the vulnerability identifier with the secure identifier to determine whether the software package includes the software vulnerability; and
provide a response about the vulnerability when the vulnerability identifier matches the secure identifier, including instructions to generate an alert to the remote device that includes a patch to resolve the software vulnerability that is a security flaw in the software package.

2. The managing system of claim 1, wherein the control module includes instructions to:
combine the package identifier with the unique identifier to form a combined identifier; and
hash the combined identifier to generate the secure identifier and disguise the combined identifier from identification.

3. The managing system of claim 2, wherein the control module includes instructions to combine including instructions to append the unique identifier to the package identifier.

4. The managing system of claim 1, wherein the control module includes instructions to compare the vulnerability identifier with the secure identifier including instructions to compare the vulnerability identifier with multiple identifiers that are secure for the remote device as defined according to a graph that indicates relationships between software components including the software package.

5. The managing system of claim 1, wherein the control module includes instructions to generate the vulnerability identifier including instructions to hash the unique identifier and the vulnerability identifier when combined together to mimic generation of the secure identifier.

6. The managing system of claim 1, wherein the control module includes instructions to identify the vulnerability including instructions to receive a communication that identifies software associated with the software vulnerability, and wherein the remote device is a vehicle.

7. The managing system of claim 1, wherein the managing device maintains the secure identifier in a centralized database for managing software packages of multiple different entities.

8. A non-transitory computer-readable medium storing instructions that, when executed by one or more processors, cause the one or more processors to:
acquire, in a managing device, identifying information about a software package installed on a remote device, including a unique identifier of an entity that is an end user of the software package the software package, and a secure identifier that combines the unique identifier with a package identifier of the software package;
responsive to identifying a software vulnerability, generate a vulnerability identifier using the unique identifier of the entity that is the end user of the software package and a vulnerability label that identifies a vulnerable software package that includes the software vulnerability;
compare the vulnerability identifier with the secure identifier to determine whether the software package includes the software vulnerability; and
provide a response about the vulnerability when the vulnerability identifier matches the secure identifier, including generating an alert to the remote device that includes a patch to resolve the software vulnerability that is a security flaw in the software package.

9. The non-transitory computer-readable medium of claim 8, wherein the instructions include instructions to:
combine the package identifier with the unique identifier to form a combined identifier; and
hash the combined identifier to generate the secure identifier and disguise the combined identifier from identification.

10. The non-transitory computer-readable medium of claim 9, wherein the instructions to combine include instructions to append the unique identifier to the package identifier.

11. The non-transitory computer-readable medium of claim 8, wherein the instructions to compare the vulnerability identifier with the secure identifier include instructions to compare the vulnerability identifier with multiple identifiers that are secure for the remote device as defined according to a graph that indicates relationships between software components including the software package.

12. The non-transitory computer-readable medium of claim 8, wherein the instructions to generate the vulnerability identifier include instructions to hash the unique identifier and the vulnerability identifier when combined together to mimic generation of the secure identifier.

13. A method, comprising:
acquiring, in a managing device, identifying information about a software package installed on a remote device, including a unique identifier of an entity that is an end user of the software package the software package, and a secure identifier that combines the unique identifier with a package identifier of the software package;
responsive to identifying a software vulnerability, generating a vulnerability identifier using the unique identifier of the entity that is the end user of the software package and a vulnerability label that identifies a vulnerable software package that includes the software vulnerability;
comparing the vulnerability identifier with the secure identifier to determine whether the software package includes the software vulnerability; and
providing a response about the software vulnerability when the vulnerability identifier matches the secure identifier, including instructions to generate an alert to the remote device that includes a patch to resolve the software vulnerability that is a security flaw in the software package.

14. The method of claim 13, further comprising:
combining the package identifier with the unique identifier to form a combined identifier; and
hashing the combined identifier to generate the secure identifier and disguise the combined identifier from identification.

15. The method of claim 14, wherein combining includes appending the unique identifier to the package identifier.

16. The method of claim 13, wherein comparing the vulnerability identifier with the secure identifier includes comparing the vulnerability identifier with multiple identifiers that are secure for the remote device as defined according to a graph that indicates relationships between software components including the software package.

17. The method of claim 13, wherein generating the vulnerability identifier includes hashing the unique identifier and the vulnerability identifier when combined together to mimic generation of the secure identifier.

18. The method of claim 13, wherein identifying the software vulnerability includes receiving a communication that identifies software associated with the software vulnerability, and wherein the remote device is a vehicle.

* * * * *